US009710156B2

(12) United States Patent
Porter et al.

(10) Patent No.: US 9,710,156 B2
(45) Date of Patent: Jul. 18, 2017

(54) THREE-DIMENSIONAL OBJECT SCULPTING AND DEFORMATION ON A MOBILE DEVICE

(71) Applicant: Disney Enterprises, Inc., Burbank, CA (US)

(72) Inventors: Kimberly Porter, Altadena, CA (US); Michele Wells, North Hollywood, CA (US); Giovanna Alaimo, North Hollywood, CA (US); Camilo Bejarano, Burbank, CA (US); Aradhana Modi, Burbank, CA (US); Alexander Ferrier, North Vancouver (CA)

(73) Assignee: Disney Enterprises, Inc., Burbank, CA (US)

( * ) Notice: Subject to any disclaimer, the term of this patent is extended or adjusted under 35 U.S.C. 154(b) by 21 days.

(21) Appl. No.: 14/496,810

(22) Filed: Sep. 25, 2014

(65) Prior Publication Data

US 2016/0092033 A1    Mar. 31, 2016

(51) Int. Cl.
*G06T 3/00* (2006.01)
*G06F 3/0488* (2013.01)
*G06T 17/05* (2011.01)

(52) U.S. Cl.
CPC ............ *G06F 3/04883* (2013.01); *G06T 3/00* (2013.01); *G06T 17/05* (2013.01); *G06T 2219/2021* (2013.01)

(58) Field of Classification Search
USPC ....... 345/619, 647, 418, 419, 660, 661, 632, 345/633, 629, 473, 173, 646; 715/864
See application file for complete search history.

(56) References Cited

U.S. PATENT DOCUMENTS

| | | | | |
|---|---|---|---|---|
| 6,054,992 A | * | 4/2000 | Gibson | G06T 17/00 345/424 |
| 6,552,722 B1 | * | 4/2003 | Shih | G06F 3/016 345/419 |
| 7,102,635 B2 | * | 9/2006 | Shih | G06F 3/016 345/419 |

(Continued)

OTHER PUBLICATIONS

Valery Adzhiev et al., "Functionally based augmented sculpting", Visualization and Computer Animation, vol. 15, No. 1, 2005, pp. 25-39.*

*Primary Examiner* — Chante Harrison
(74) *Attorney, Agent, or Firm* — Farjami & Farjami LLP

(57) ABSTRACT

There are provided systems and methods for three-dimensional object sculpting and deformation on a mobile device. The system including a display, a memory storing a sculpting software application, and a processor configured to execute the sculpting software application to present an object to the user on the display, receive a first user input from the user for deforming the object, deform the object based on the first user input to generate a deformed object, receive a second user input from the user for squishing the deformed object using a squishing machine, and re-present the deformed object on the display next to the squishing machine. Squishing the deformed object may include breaking the deformed object in a blending machine, melting the deformed object with a heating machine, blowing the deformed object up with a pump, or breaking the deformed object up within a bubble.

8 Claims, 5 Drawing Sheets

(56) References Cited

U.S. PATENT DOCUMENTS

| | | | | |
|---|---|---|---|---|
| 2002/0149583 | A1* | 10/2002 | Segawa | G06F 3/011 345/420 |
| 2004/0233223 | A1* | 11/2004 | Schkolne | G06F 3/0346 345/621 |
| 2008/0278484 | A1* | 11/2008 | Payandeh | G06T 17/20 345/419 |
| 2009/0036220 | A1* | 2/2009 | Nagashima | A63F 13/00 463/43 |
| 2011/0164029 | A1* | 7/2011 | King | G06F 3/04883 345/419 |
| 2012/0013613 | A1* | 1/2012 | Vesely | G06F 3/011 345/419 |
| 2012/0135803 | A1* | 5/2012 | Nonaka | G06F 3/011 463/31 |
| 2013/0127874 | A1* | 5/2013 | Peterson | G06T 13/80 345/473 |
| 2013/0235071 | A1* | 9/2013 | Ubillos | G06F 3/0484 345/600 |
| 2014/0273717 | A1* | 9/2014 | Judkins | A63H 3/28 446/175 |
| 2015/0067601 | A1* | 3/2015 | Bernstein | G06F 3/0488 715/823 |

* cited by examiner

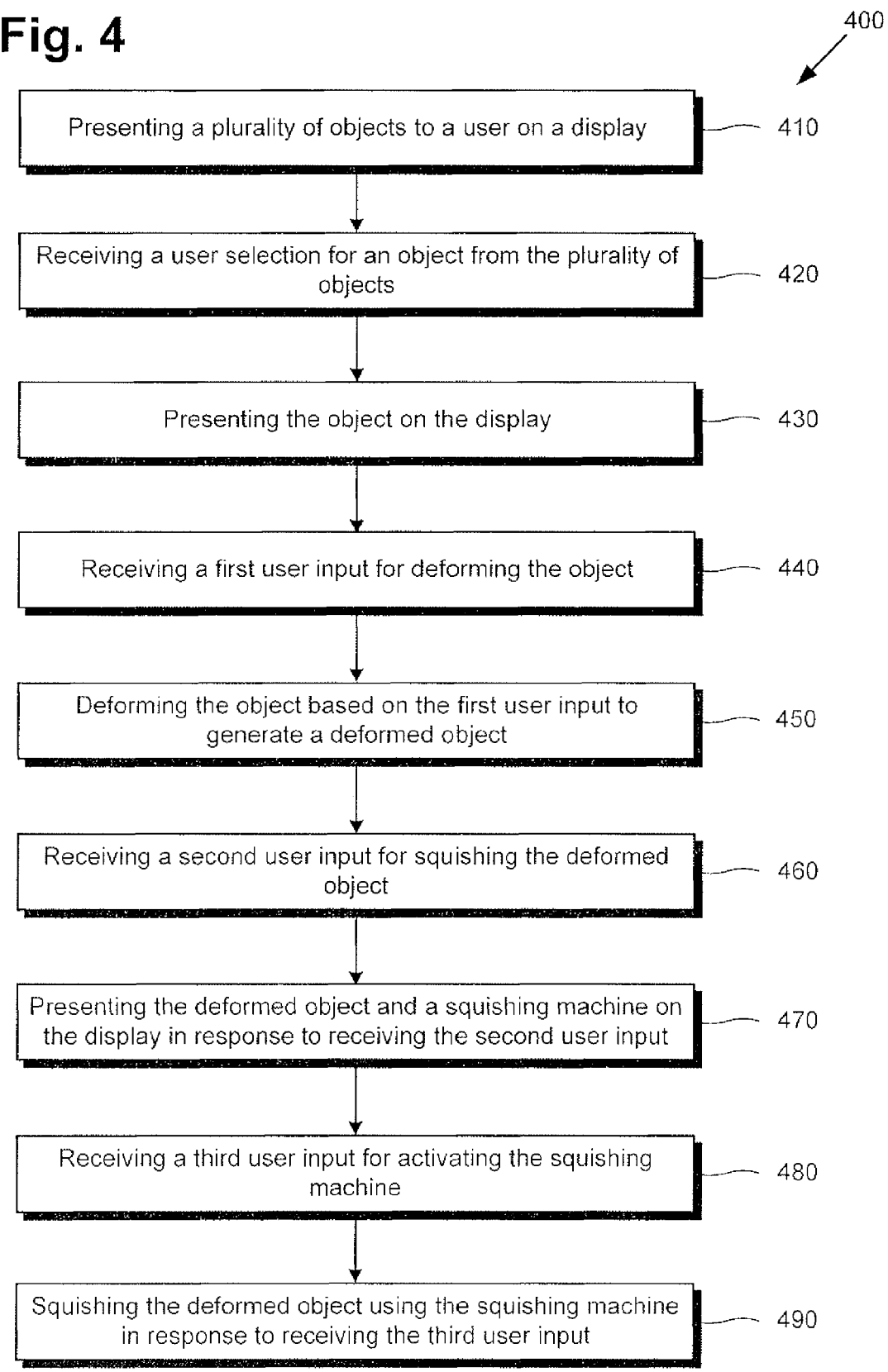

THREE-DIMENSIONAL OBJECT SCULPTING AND DEFORMATION ON A MOBILE DEVICE

BACKGROUND

Physically sculpting clay structures can be a fun and entertaining activity for kids. It allows the kids to use their imaginations to create different objects or characters, thus becoming an artist of their own work. However, allowing kids to sculpt clay structures does come with a few down sides. For example, clay and other products must be purchased each time a kid wants to sculpt a clay structure, which can cost quite a lot of money. Furthermore, sculpting clay structures can be quite messy and very difficult to clean up.

Nowadays, the digital world has also provided kids with fun and entertaining games and activities, which kids can play on using their very own mobile devices. For example, kids are able to download software applications onto their mobile devices that allow them to play different board games, trivia games, sports games, or other games and activities that can be entertaining. This allows kids to experience the games and activities that they use to play in the physical world on their mobile devices.

SUMMARY

The present disclosure is directed to three-dimensional object sculpting and deformation on a mobile device, substantially as shown in and/or described in connection with at least one of the figures, as set forth more completely in the claims.

BRIEF DESCRIPTION OF THE DRAWINGS

FIG. 4 shows a flowchart illustrating a method three-dimensional object sculpting and deformation on a mobile device, according to one implementation of the present disclosure.

DETAILED DESCRIPTION

Figure 1:
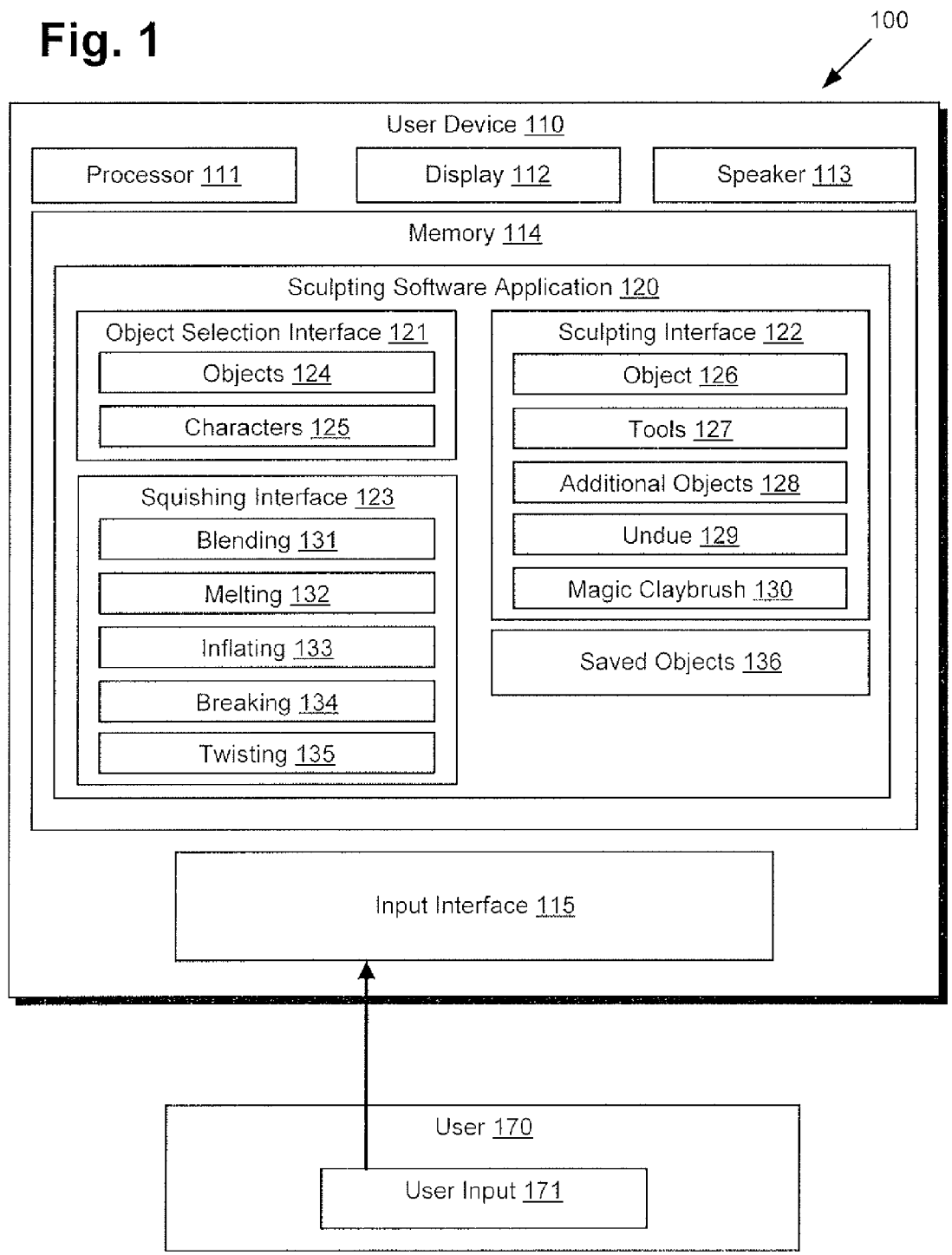
FIG. 1 presents a system for three-dimensional object sculpting and deformation on a mobile device, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for three-dimensional object sculpting and deformation on a mobile device, according to one implementation of the present disclosure. System 100 of FIG. 1 includes user device 110 and user 170. User device 110 includes processor 111, display 112, speaker 113, memory 114, and input interface 115. Memory 114 includes sculpting software application 120, which includes object selection interface 121, sculpting interface 122, squishing interface 123, and saved objects 136. Object selection interface 121 includes objects 124 and characters 125. Sculpting interface 122 includes object 126, tools 127, additional objects 128, undue 129 and magic claybrush 130. Squishing interface 123 includes blending 131, melting 132, inflating 133, breaking 134, and twisting 135. User 170 includes user input 171.

User device 110 may comprise a mobile phone, a personal computer, a tablet, or any other electronic device capable of executing sculpting software application 120. As illustrated in FIG. 1, user device 110 includes user interface 115 and display 112. User interface 115 may comprise, for example, a keyboard, a mouse, a game controller, a touch-screen input, a thermal and/or electrical sensor, or any other device capable of accepting user input 171 for use with user device 110. Display 112 may comprise a liquid crystal display ("LCD"), a light-emitting diode ("LED"), an organic light-emitting diode ("OLED"), or another suitable display screen built into user device 110 that performs a physical transformation of signals to light. In some implementations, display 112 may also be touch sensitive and may serve as user interface 115.

Also illustrated in FIG. 1, user device 110 includes processor 111 and memory 114. Processor 111 may be configured to access memory 114 to store received input or to execute commands, processes, or programs stored in memory 114, such as sculpting software application 120. Processor 111 may correspond to a processing device, such as a microprocessor or similar hardware processing device, or a plurality of hardware devices. Memory 114 is a sufficient memory capable of storing commands, processes, and programs for execution by processor 111.

Also illustrated in FIG. 1, user device 110 includes sculpting software application 120. User 170 of user device 110 may utilize sculpting software application 120 to sculpt and deform three-dimensional objects in real-time on user device 110 in a similar way as user 170 would sculpt and deform clay objects in the physical world. Sculpting software application 120 allows user 170 to sculpt and deform three-dimensional objects using various steps. For example, sculpting software application 120 may first allow user 170 to select an object using object selection interface 121, sculpt and deform the object using sculpting interface 122, and then squish the object using squishing interface 123.

Object selection interface 121 may include a user interface provided by sculpting software application 120 that allows user 170 to select a three-dimensional object for sculpting and deforming. As illustrated in FIG. 1, object selection interface 121 includes objects 124 and characters 125. Objects 124 may include different objects that can be selected by user 170 for sculpting and deforming. For example, objects 124 may include, but are not limited to, people, animals, cars, buildings, common shapes (such as spheres or cubes), or any other objects or shapes that can be sculpted and deformed using sculpting software application 120. Characters 125 may include a special category of selectable objects that correspond to real or animated characters. For example, characters 125 may include real or animated characters from movies, television shows, comic books, or any other characters that can be sculpted and deformed using sculpting software application 120.

Sculpting interface 122 may include a user interface provided by sculpting software application 120 that allows user 170 to sculpt and deform the three-dimensional object that was selected using object selection interface 121. For example, after user 170 uses object selection interface 121 to select one of objects 124 or characters 125, sculpting software application 120 may present user 170 with sculpting interface 122. In one implementation, user 170 may have to perform some action to get the selected object to appear within sculpting interface 122. For example, user 170 may have to pull on a rope displayed within sculpting interface 122 to get the selected object to appear.

Figure 2:
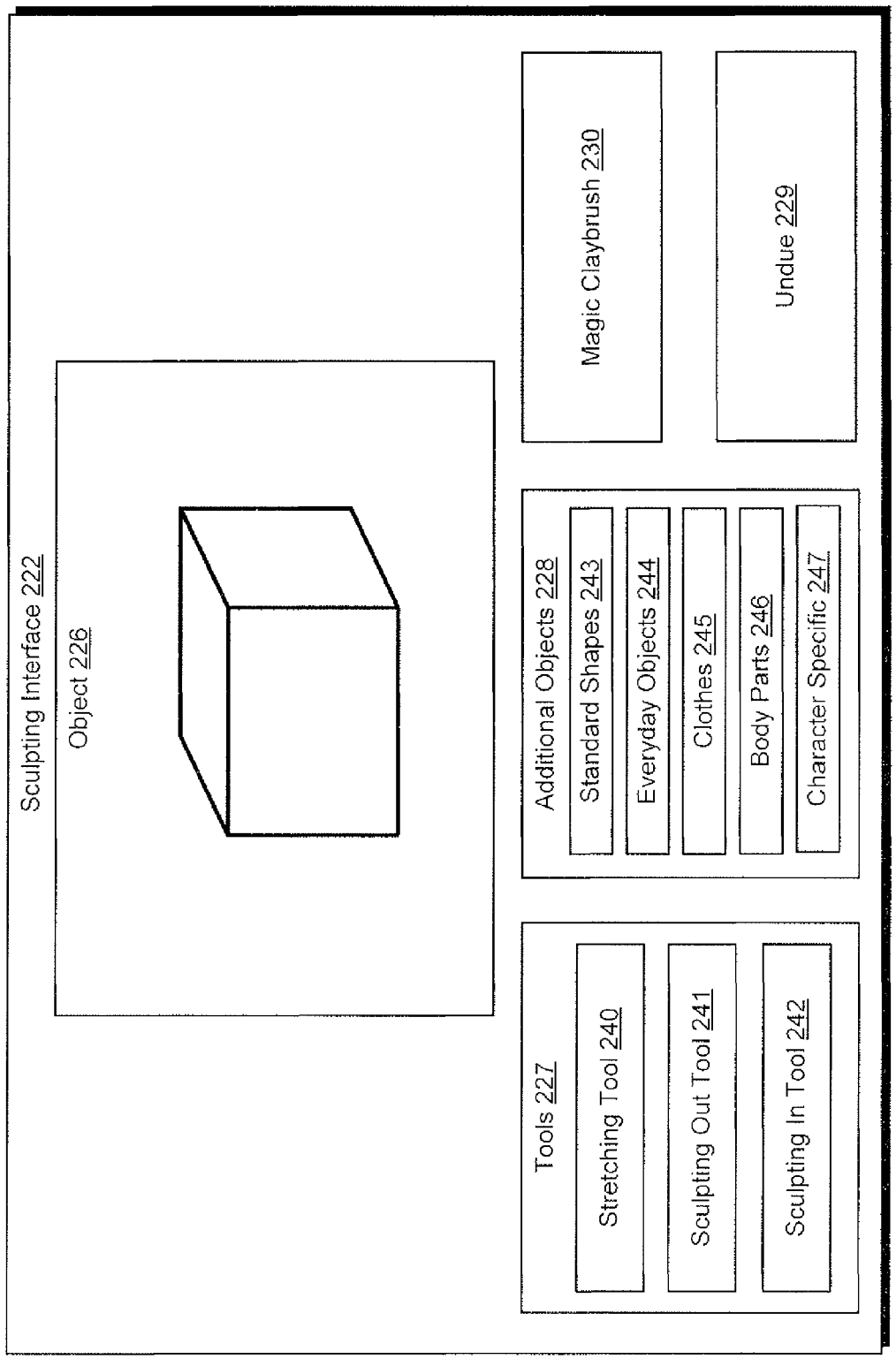
FIG. 2 presents an example of a sculpting interface that can be used to sculpt three-dimensional objects on a mobile device, according to one implementation of the present disclosure.

As illustrated in FIG. 1, sculpting interface 122 includes object 126, tools 127, additional objects 128, undue 129 and magic claybrush 130. Object 126 may include the three-dimensional object selected by user 170 using object selection interface 121. For example, object 126 may include one of objects 124 or one of characters 125. Tools 127 may include the different sculpting tools that are presented to user 170 for sculpting and deforming object 126. For example, and as illustrated in FIG. 2, tools 127 may include, but are not limited to, a stretching tool, a sculpting out tool, and a sculpting in tool.

Additional objects 128 may include additional objects that can be added to object 126 while sculpting and deforming object 126. For example, and as illustrated in FIG. 2, additional objects 128 may include, but are not limited to, standard shapes, everyday objects, clothes, body parts, or character specific objects. Undue 129 may include a button displayed within sculpting interface 122 that user 170 can use to undue any sculpting or deforming that was just applied to object 126. For example, if user 170 stretches object 126 vertically farther than he or she was trying to, user 170 can use undue 129 to undue the vertical stretching of object 126.

Magic claybrush 130 may include a tool that can be utilized by user 170 to return any part of object 126 that has been sculpted or deformed back to how it originally looked. For example, if user 170 is using sculpting interface 122 to sculpt and deform a cartoon character as object 126, user 170 may first stretch the right arm of object 126, add ears onto object 126, bend the left leg of object 126, stretch the ears previously added on object 126, and then stretch the left arm of object 126. In such an example, user 170 can use magic claybrush 130 to return any of the previous actions performed on object 126 back to its original look. For example, user 170 may use magic claybrush 130 on the right arm of object 126 to return it back to its original length. For another example, user 170 may use magic claybrush 130 on the added ears of object 126 to return the added ears to their original size, e.g. before they were stretched. As such, magic claybrush 130 may work both on object 126 or any of additional objects 128 added to object 126.

Squishing interface 123 may include a user interface provided by sculpting software application 120 that allows user 170 to squish object 126 at anytime during the sculpting and deforming of object 126. For example, user 170 may squish object 126 while in the process of sculpting or deforming object 126 using sculpting interface 122. For another example, user 170 may squish object 126 after he or she is finished sculpting and deforming object 126 and saved object 126. As will be described in greater detail below with regard to FIGS. 3A-3D, user 170 may squish object 126 using various methods which include, but are not limited to, blending 131, melting 132, inflating 133, breaking 134, and twisting 135.

Also illustrated in FIG. 1, sculpting software application 120 includes saved objects 136. Saved objects 136 may include previously saved three-dimensional objects that were sculpted and deformed by user 170 using sculpting software application 120. For example, if user 170 is using sculpting software application 120 to sculpt and deform object 126 within sculpting interface 122, user 170 may save object 126 within saved objects 136. In such an example, user 170 may then load object 126 from saved objects 136 at any point to further sculpt and deform object using sculpting interface 122, or user 170 may load object 126 from saved objects 136 at any point to squish object 126 using squishing interface 123.

In the implementation of FIG. 1, user 170 may be using sculpting software application 120 running on user device 110 to sculpt and deform a three-dimensional object 126. First, user 170 uses object selection interface 121 to select object 126, where the object 126 may include one of objects 124 or one of characters 125. After selecting object 126 from object selection interface 121, user 170 then uses sculpting interface 122 to sculpt and deform object 126. For example, and as discussed above, user 170 may sculpt and deform object 126 using tools 127 and additional objects 128. Furthermore, user 170 may undue a previously made action to object 126 using undue 129, or reset part of object 126 that has already been sculpted and deformed back to its original look using magic claybrush 130.

Continuing with the implementation of FIG. 1, after user 170 has finished sculpting and deforming object 126 using sculpting interface 122, user 170 may save object 126 in saved objects 136 and/or squish object 126 using squishing interface 123. As discussed above, and as will be discussed in greater detail with regard to FIGS. 3A-3D, user 170 may squish object 126 using a number of different methods. For example, user 170 may squish object 126 using blending 131, melting 132, inflating 133, breaking 134, or twisting 135. After user 170 has squished object 126, sculpting software application 120 may then return object 126 back to how object 126 looked before the squishing.

FIG. 2 presents an example of a sculpting interface that can be used to sculpt three-dimensional objects on a mobile device, according to one implementation of the present disclosure. Sculpting interface 222 of FIG. 2 includes object 226, tools 227, additional objects 228, undue 229, and magic claybrush 230. Tools 227 include stretching tool 240, sculpting out tool 241, and sculpting in tool 242. Additional objects 228 include standard shapes 243, everyday objects 244, clothes 245, body parts 246, and character specific 247. With regard to FIG. 2, it should be noted that sculpting interface 222, object 226, tools 227, additional objects 228, undue 229, and magic claybrush 230 correspond respectively to sculpting interface 122, object 126, tools 127, additional objects 128, undue 129, and magic claybrush 130 from FIG. 1.

Sculpting interface 222 of FIG. 2 may be used by a user to sculpt and deform three-dimensional objects, such as user 170 sculpting and deforming object 126 from FIG. 1, where object 126 corresponds to object 226. When sculpting and deforming object 226, sculpting interface 222 allows the user to both perform coarse modeling, such as pulling the entire mesh of object 226 around, or fine modeling, such as sculpting and deforming on a small region (or part) of object 226. The user may sculpt and deform object 226 using tools 227, which include various sculpting tools that the user can use to sculpt and deform object 226. Furthermore, the user may use additional objects 228, which include different objects that can be added to object 226.

Tools 227 may be used by a user when sculpting and deforming object 226. In one implementation, the user uses tools 227 by selecting a tool from tools 227 and swiping the tool over the part of object 226 that the user wants to sculpt and deform. For example, if the user is using sculpting interface 222 on a user device that includes touch sensitive display, the user merely has to select a tool from tools 227 and swipe his or her finger over the part of object 226 that the user wants to sculpt and deform. As illustrated in FIG. 2, tools 227 include stretching tool 240, sculpting out tool 241, and sculpting in tool 242.

Stretching tool 240 may include a tool that can be used by the user to stretch object 226. When stretching object 226, the user can use stretching tool 240 to either stretch a part of object 226, or the user can use stretching tool 240 to stretch the entire object 226. For example, if a user was using sculpting interface 222 to sculpt and deform a cartoon character (corresponding to object 226), the user may use stretching tool 240 to either stretch an arm of the cartoon character, or the user may use stretching tool 240 to stretch the entire body of the cartoon character. In such an example, if the user is using a user device that includes a touch sensitive display, the user would select stretching tool 240 from tools 227 and swipe his or her finger over the area of the cartoon character that the user wanted to stretch, such as the arm or the entire body of the cartoon character.

Sculpting out tool 241 may include a tool that can be used by the user to expand object 226. When expanding object 226, the user can use sculpting out tool 241 to either expand a part of object 226, or the user can use sculpting out tool 241 to expand the entire object 226. For example, and using the example above where the user is using sculpting interface 222 to sculpt and deform a cartoon character, the user may use sculpting out tool 241 to either expand an arm of the cartoon character, or the user may use sculpting out tool 241 to expand the entire body of the cartoon character. In such an example, if the user is using a user device that includes a touch sensitive display, the user would select sculpting out tool 241 from tools 227 and swipe his or her finger over the area of the cartoon character that the user wanted to expand, such as the arm or the entire body of the cartoon character.

Sculpting in tool 242 may include a tool that can be used by the user to better define a part of object 226 by indenting the selected part of object 226 inward. As such, using sculpting in tool 242 on object 226 would be similar to using a finger to physically press in on a physical clay object. For example, and using the example above where the user is using sculpting interface 222 to sculpt and deform a cartoon character, the user may use sculpting in tool 242 to indent a part of the face of the cartoon character where the mouth should be located. In such an example, if the user is using a user device that includes a touch sensitive display, the user would select sculpting in tool 242 from tools 227 and swipe his or her finger over the area of the face of the cartoon character where he or she wants the mouth be located at.

Additional objects 228 may be used by the user to add special objects to object 226. The user may add additional objects 228 to object 226 by first selecting one of additional objects 228, and then placing the selected additional object on object 226. As illustrated in FIG. 2, additional objects 228 include standard shapes 243, everyday objects 244, clothes 245, body parts 246, and character specific 247.

Standard shapes 243 may include different geometrical shapes that can be selected and added to object 226. For example, standard shapes 243 may include, but are not limited to, spheres and cubes. Everyday objects 244 may include different everyday objects that can be added to object 226, such as objects that people see in their everyday lives. For example, everyday objects 244 may include, but are not limited to, cars, sporting equipment, furniture, buildings, and office supplies.

Clothes 245 may include different clothing and clothing accessories that can be added to object 226, such as when object 226 includes a person or character. For example, clothes 245 may include, but are not limited to, shirts, pants, shoes, coats, purses, watches, and ties. Body parts 146 may include different body parts 246 that can be added to object 226, also when object 226 includes a person or character. For example, body parts 246 may include, but are not limited to, legs, arm, ears, and eyes, and noses.

Character specific 247 may include different objects that are specific to one or more special characters. For example, and as discussed above in FIG. 1, a user may select object 226 that includes a special one of characters 125, such as a real or animated character from a movie, television show, or comic book. As such, character specific 247 objects include objects that are specific to one or more of the real or animated characters from movies, television shows, or comic books. For example, if a character from an animated show always wears a special piece of clothing that is custom made for that character, character specific 247 would include that special piece of clothing.

Figure 3A:
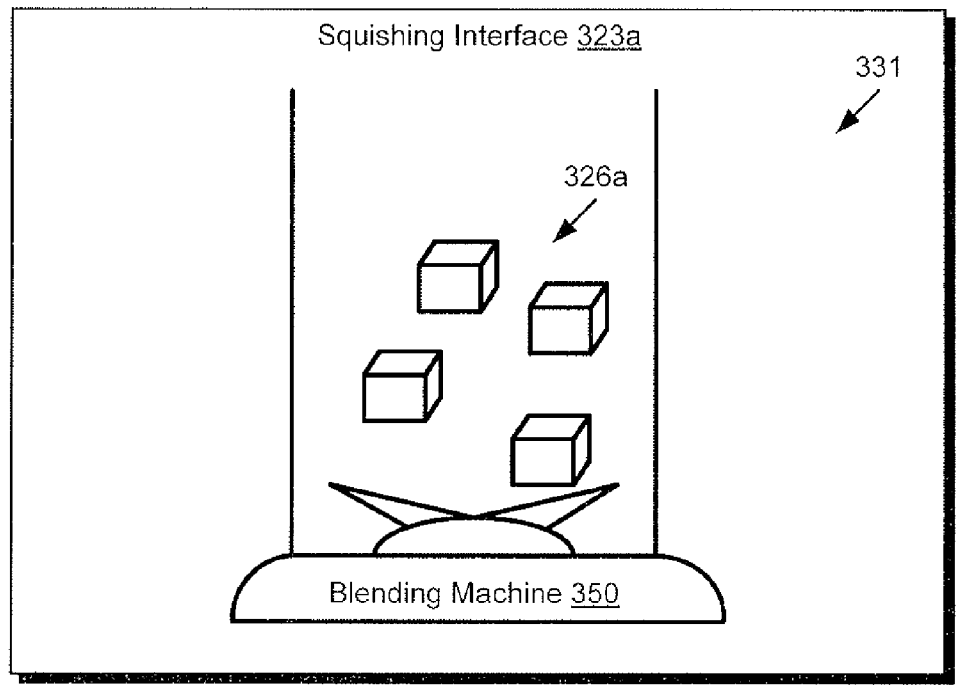
FIG. 3A present an example of blending a sculpted three-dimensional object, according to one implementation of the present disclosure.

FIG. 3A present an example of blending a sculpted three-dimensional object, according to one implementation of the present disclosure. Squishing interface 323a of FIG. 3A includes object 326a, blending 331, and blending machine 350. With respect to FIG. 3A it should be noted that squishing interface 323a, object 326a, and blending 331 correspond respectively to squishing interface 123, object 126, and blending 131 from FIG. 1. It should further be noted that object 326a of FIG. 3A corresponds to object 226 from FIG. 2.

As illustrated in the implementation of FIG. 3A, a user may have decided to squish object 326a using blending 331. Blending 331 may include breaking object 326a into pieces using blending machine 350, where blending machine 350 in FIG. 3A is illustrated as a blender. To squish object 326a using blending 331, object 326a is first placed within blending machine 350. The user then activates blending machine 350 in order to break object 326a into pieces, such as the four pieces that are illustrated in FIG. 3A. In one implementation, where the user is using a touch sensitive display on a user device to use squishing interface 323a, blending machine 350 may be activated by the user swiping his or her finger in a circular pattern on the touch sensitive display.

It should be noted that the implementation of FIG. 3A only illustrates one example of using blending 331 to squish object 326a, however, the present disclosure is not limited to the implementation of FIG. 3A. In other implementations, other methods may be used to break object 326a into pieces using blending 331. For example, blending 331 may include using more than one blending machine that combine to break object 326a into pieces.

Figure 3B:
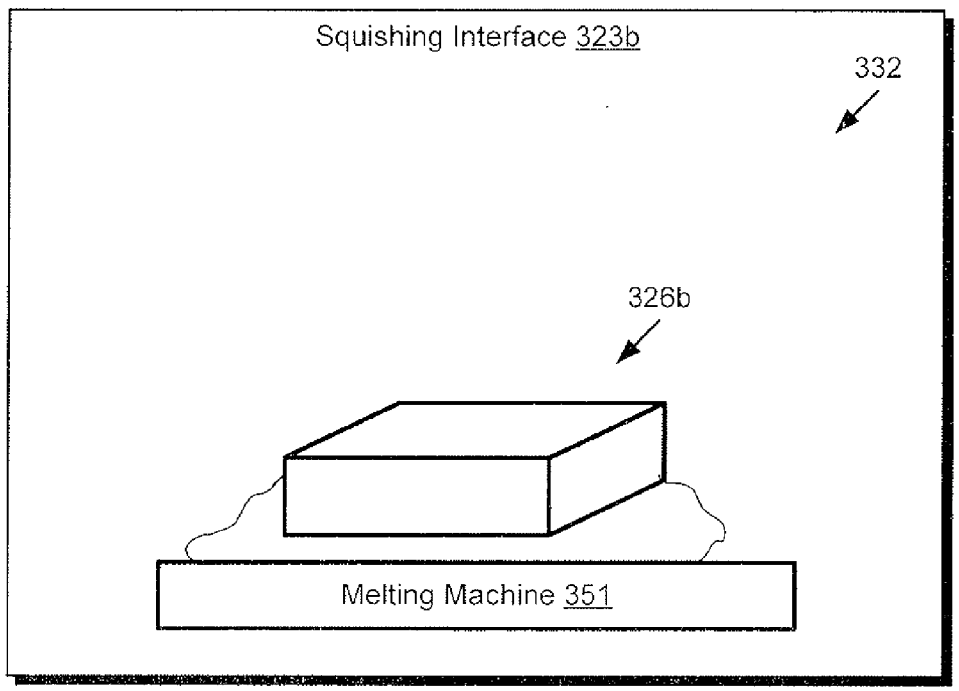
FIG. 3B presents an example of melting a sculpted three-dimensional object, according to one implementation of the present disclosure.

FIG. 3B presents an example of melting a sculpted three-dimensional object, according to one implementation of the present disclosure. Squishing interface 323b of FIG.

3B includes object 326*b*, melting 332, and melting machine 351. With respect to FIG. 3B, it should be noted that squishing interface 323*b*, object 326*b*, and melting 332 correspond respectively to squishing interface 123, object 126, and melting 132 from FIG. 1. It should further be noted that object 326*b* of FIG. 3B corresponds to object 226 from FIG. 2.

As illustrated in the implementation of FIG. 3B, a user may have decided to squish object 326*b* using melting 332. Melting 332 may include melting object 326*b* using some sort of heating device, such as melting machine 351. To melt object 326*b* using melting 332, object 326*b* is first placed on top of melting machine 351. The user then activates melting machine 351 in order to melt object 326*b*. In one implementation, where the user is using a touch sensitive display on a mobile device to use squishing interface 323*b*, melting machine 351 may be activated by the user tapping his or her finger on the touch sensitive display.

It should be noted that the implementation of FIG. 3B only illustrates one example of using melting 332 to melt object 326*b*, however, the present disclosure is not limited to the implementation of FIG. 3B. In other implementations, other methods may be used to squish object 326*b* using melting 332. For example, melting 332 may include using two different melting machines, where each melting machine is placed on an opposite side of object 326*b*. In such an example, the user can melt either side of object 326*b* by activating one of the two melting machines, where each melting machine is activated by the user tapping on that specific melting machine.

Figure 3C:
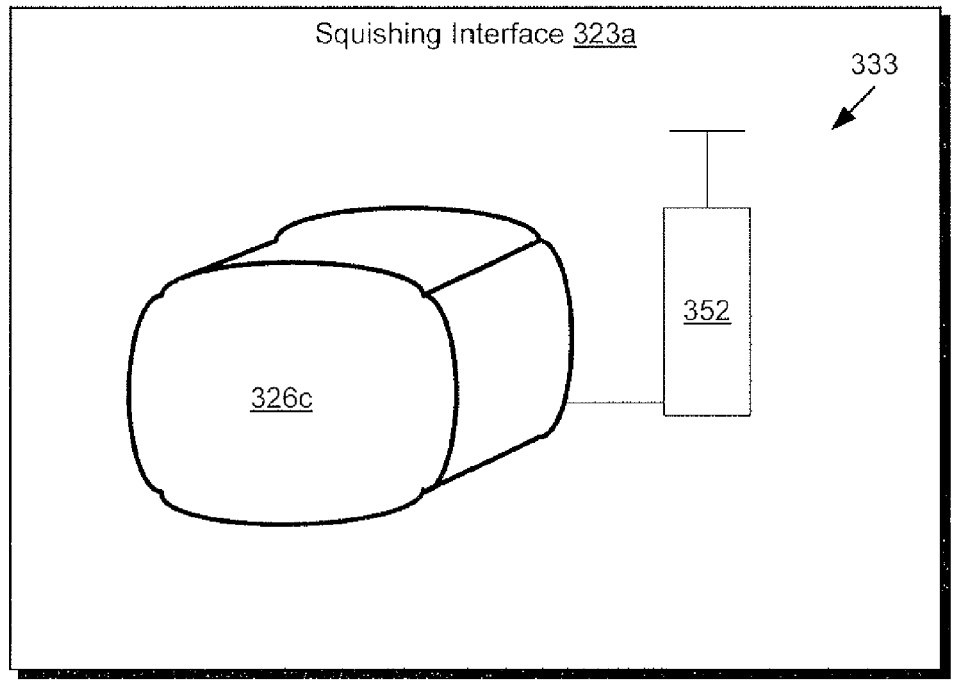
FIG. 3C presents an example of inflating a sculpted three-dimensional object, according to one implementation of the present disclosure.

FIG. 3C presents an example of inflating a sculpted three-dimensional object, according to one implementation of the present disclosure. Squishing interface 323*c* of FIG. 3C includes object 326*c*, inflating 333, and inflating machine 352. With respect to FIG. 3C, it should be noted that squishing interface 323*c*, object 326*c*, and inflating 333 correspond respectively to squishing interface 123, object 126, and inflating 133 from FIG. 1. It should further be noted that object 326*c* of FIG. 3C corresponds to object 226 from FIG. 2.

As illustrated in the implementation of FIG. 3C, a user may have decided to inflate object 326*c* using inflating 333. Inflating 333 may include inflating object 326*c* using some sort of inflating device until object 326*c* explodes, such as by using pump 352. To inflate object 326*c* using inflating 333, object 326*c* is first connect to pump 352. The user then activates pump 352 in order to inflate object 326*c*. In one implementation, where the user is using a touch sensitive display on a mobile device to use squishing interface 323*c*, pump 352 may be activated by the user swiping his or her finger up and down on the touch sensitive display.

It should be noted that the implementation of FIG. 3C only illustrates one example of using inflating 333 to inflate object 326*c*, however, the present disclosure is not limited to the implementation of FIG. 3C. In other implementations, other methods may be used to squish object 326*c* using inflating 333. For example, other types of inflating devices may be used to inflate object 326*c* using inflating 333, such as a motorized pump. For another example, more than one inflating machine may be used when inflating object 326*c* using inflating 333.

Figure 3D:
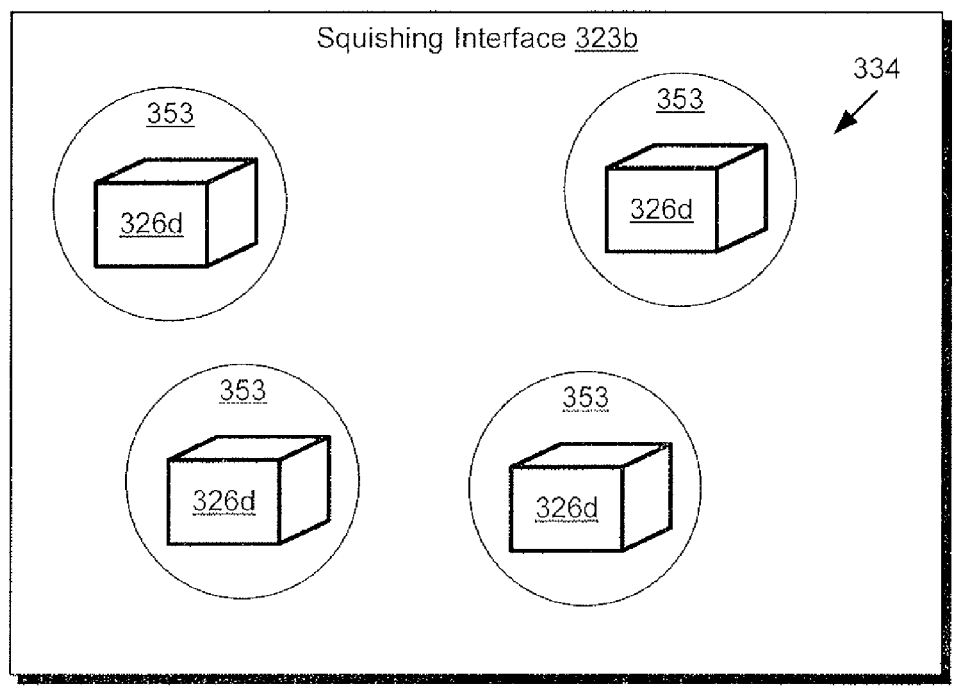
FIG. 3D presents an example of breaking a sculpted three-dimensional object, according to one implementation of the present disclosure.

FIG. 3D presents an example of breaking a sculpted three-dimensional object, according to one implementation of the present disclosure. Squishing interface 323*d* of FIG. 3D includes object 326*d*, breaking 334, and bubbles 353. With respect to FIG. 3D, it should be noted that squishing interface 323*d*, object 326*d*, and breaking 334 correspond respectively to squishing interface 123, object 126, and inflating 133 from FIG. 1. It should further be noted that object 326*d* of FIG. 3D corresponds to object 226 from FIG. 2.

As illustrated in the implementation of FIG. 3D, a user may have decided to break object 326*d* using breaking 334. Breaking 334 may include breaking object 326*d* by placing object in some sort of breaking device that breaks into multiple pieces, such as bubbles 353. To break object 326*d* using breaking 334, object 326*d* is first placed in a giant bubble (not shown). The user then breaks the giant bubble, including object 326*d*, into bubbles 353. In one implementation, where the user is using a touch sensitive display on a mobile device to use squishing interface 323*d*, the giant bubble may be broken into bubbles 353 by the user tapping his or her finger on the giant bubble displayed on the touch sensitive display. The user may then continue to tap his or her finger on each of bubbles 353 to break each of bubbles 353 into smaller bubbles.

It should be noted that the implementation of FIG. 3D only illustrates one example of using breaking 334 to break object 326*d*, however, the present disclosure is not limited to the implementation of FIG. 3D. In other implementations, other methods may be used to squish object 326*d* using breaking 334. For example, object 326*d* may be placed in other objects other than bubbles, such as a balloon that is popped when the user taps on the touch sensitive display.

It should further be noted that while the implementations FIGS. 7A-7D only illustrate four different methods of squishing an object, the present disclosure is not limited to the implementations of FIGS. 7A-7D. In other implementations, an object may be squished using other methods. For example, and as illustrated in FIG. 1, an object may be squished using twisting 135. In such an example, the user is able to twist the object around and around until the object cannot be twisted anymore or breaks.

FIG. 4 shows a flowchart illustrating a method three-dimensional object sculpting and deformation on a mobile device, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIG. 1, the disclosed inventive concepts are not intended to be limited by specific features shown and described with respect to FIG. 1. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 (at 410) includes presenting a plurality of object to a user on a display and (at 420) receiving a user selection for an object from the plurality of objects. For example, processor 111 of user device 110 may execute sculpting software application 120 to present objects 124 and characters 125 to user 170 using object selection interface 121 on display 112. Processor 111 of user device 110 may then execute sculpting software application 120 to receive user input 171 for selecting object 126 from objects 124 and characters 125. As discussed above, object selection interface 121 is used by user 170 to select object 126 for sculpting and deforming.

Flowchart 400 (at 430) continues with presenting the object on the display. For example, processor 111 of user device 110 may execute sculpting software application 120 to present object 126 using sculpting interface 122 on display 112. As discussed above, user 170 uses sculpting interface 122 to sculpt and deform object 126.

Flowchart 400 (at 440) continues with receiving a first user input for deforming the object and (at 450) deforming the object based on the user input to generate a deformed object. For example, processor 111 of user device 110 may execute sculpting software application 120 to receive a first user input 171 for deforming object 126 and deform object 126 according to the first user input 171 to generate a deformed object 126. As discussed above, user 170 may use tools 127 and additional objects 128 when sculpting and deforming object 126. As illustrated in FIG. 2, tools 227 may include stretching tool 240, sculpting out tool 241, and sculpting in tool 242, and additional objects 228 may include standard shapes 243, everyday object 244, clothes 245, body parts 246, and character specific 247.

Flowchart 400 (at 460) continues with receiving a second user input for squishing the deformed object and (at 470) presenting the deformed object and a squishing machine on the display in response to receiving the second user input. For example, processor 111 of user device 110 may execute sculpting software application 120 to receive a second user input 171 for squishing the deformed object 126 and present the deformed object 126 and a squishing machine using squishing interface 123 on display 112 in response to receiving the second user input 171. As discussed above, user 170 can squish the deformed object 126 using blending 131, melting 132, inflating 133, breaking 134, and twisting 135. As such, and as illustrated in FIGS. 3A-3D, a squishing machine may include blending machine 350, melting machine 351, pump 352, and bubbles 353.

Flowchart 400 (at 480) continues with receiving a third user input for activating the squishing machine and (at 490) squishing the deformed object using the squishing machine in response to receiving the third user input. For example, processor 111 of user device 110 may execute sculpting software application 120 to receive a third user input 171 for activating the squishing machine and squish the deformed object 126 using the squishing machine in response to receiving the third user input 171. As discussed above, the third user input 171 may include user 170 swiping his or her finger in circles on display 112, tapping on display 112, or swiping his or finger up and down on display 112. Furthermore, and as illustrated in FIGS. 3A-3D, squishing the deformed object 126 may include blending the deformed object 326a using blending machine 350, melting the deformed object 326b using melting machine 352, inflating the deformed object 326c using pump 352, and breaking the deformed object 326d using bubbles 353.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user device comprising:
  a display;
  a memory storing a three-dimensional sculpting software application; and
  a processor configured to execute the sculpting software application to:
    present an original three-dimensional object having a first portion to a user on the display;
    present a plurality of tools to the user on the display, the plurality of tools including a sculpting out tool and a sculpting in tool;
    receive a first user input from the user for deforming the original three-dimensional object, wherein the first user input includes selecting a tool from the plurality of tools and selecting the first portion of the original three-dimensional object;
    deform the first portion of the original three-dimensional object based on the first user input to generate a first deformed three-dimensional object;
    receive a second user input for squishing the first deformed three-dimensional object using a squishing machine, wherein the squishing includes blending the first deformed three-dimensional object to create a second deformed three-dimensional object;
    present the second deformed three-dimensional object on the display next to the squishing machine;
    receive a selection from the user for using another tool from among the plurality of tools;
    receive a third user input, the third user input including swiping the tool over an area of the second deformed object corresponding to the first portion of the original three-dimensional object; and
    reform the area of the second deformed three-dimensional object back to an original state of the original three-dimensional object, the original state corresponding to the first portion of the original three-dimensional object.

2. The user device of claim 1, wherein the plurality of tools further includes a stretching tool, an inflating tool, a twisting tool, and a melting tool.

3. The user device of claim 1, wherein the processor is further configured to execute the three-dimensional sculpting software application to:
  present a plurality of additional three-dimensional objects to the user on the display, and wherein the first user input includes selecting an additional three-dimensional object from the plurality of additional three-dimensional objects.

4. The user device of claim 3, wherein the additional three-dimensional object includes at least one of a standard shape, an everyday object, a piece of clothing or clothing accessory, a body part, and a character specific object.

5. A method for use by a user device including a display and a processor executing a three-dimensional sculpting software application stored in a memory, the method comprising:
  presenting, by the processor to a user on the display, an original three-dimensional object having a first portion;
  presenting, by the processor, a plurality of tools to the user on the display, the plurality of tools including a sculpting out tool and a sculpting in tool;
  receiving, by the processor, a first user input from the user for deforming the original three-dimensional object, wherein the first user input includes selecting a tool from the plurality of tools and selecting the first portion of the original three-dimensional object;

deforming, by the processor, the first portion of the original three-dimensional object based on the first user input to generate a first deformed three-dimensional object;

receiving, by the processor, a second user input for squishing the first deformed three-dimensional object using a squishing machine, wherein the squishing includes blending the first deformed three-dimensional object to create a second deformed three-dimensional object;

presenting, by the processor to the user on the display, the second deformed three-dimensional object next to the squishing machine; and receiving, by the processor, a selection from the user for using another tool from among the plurality of tools;

receiving, by the processor, a third user input, the third user input including swiping the tool over an area of the second deformed object corresponding to the first portion of the original three-dimensional object; and reforming, by the processor, the area of the second deformed three-dimensional object back to an original state of the original three-dimensional object, the original state corresponding to the first portion of the original three-dimensional object.

6. The method of claim 5, wherein the plurality of tools further includes a stretching tool, and inflating tool, a twisting tool, and a melting tool.

7. The method of claim 5, the method further comprising:
presenting a plurality of additional three-dimensional objects to the user on the display, wherein the first user input includes selecting an additional three-dimensional object from the plurality of additional three-dimensional objects.

8. The method of claim 7, wherein the additional three-dimensional object includes at least one of a standard shape, an everyday object, a piece of clothing or clothing accessory, a body part, and a character specific object.

* * * * *